United States Patent [19]

Moore et al.

[11] Patent Number: 5,528,742
[45] Date of Patent: Jun. 18, 1996

[54] METHOD AND SYSTEM FOR PROCESSING DOCUMENTS WITH EMBEDDED FONTS

[75] Inventors: George M. Moore, Redmond; Dennis R. Adler, Mercer Island; David N. Weise, Kirkland, all of Wash.

[73] Assignee: Microsoft Corporation, Redmond, Wash.

[21] Appl. No.: 329,670

[22] Filed: Oct. 26, 1994

Related U.S. Application Data

[63] Continuation of Ser. No. 45,825, Apr. 9, 1993, abandoned.

[51] Int. Cl.⁶ .................................................. G06K 15/00
[52] U.S. Cl. .................................................. 395/145
[58] Field of Search ................................... 395/144, 145, 395/148, 150, 151, 161; 382/61

[56] References Cited

U.S. PATENT DOCUMENTS

| | | | |
|---|---|---|---|
| 4,933,984 | 6/1990 | Nakano et al. | 382/61 X |
| 4,949,287 | 8/1990 | Yamaguchi et al. | 395/148 X |
| 5,142,613 | 8/1992 | Morikawa et al. | 395/150 X |
| 5,142,620 | 8/1992 | Watanabe et al. | 395/164 X |
| 5,367,618 | 11/1994 | Ishida | 395/145 X |

Primary Examiner—Heather R. Herndon
Assistant Examiner—Cliff N. Vo
Attorney, Agent, or Firm—Seed and Berry

[57] ABSTRACT

A user of a host computer creates a document and embeds in the document a font file used to create the document. The user then transfers the document, along with the embedded font file, to a remote computer. The remote computer processes the document using the embedded font file. If the embedded font file contains a preview and print type of font, then the remote computer allows users to preview the document on a display screen and to print the document on a printer using the embedded font. However, the preview and print type of font does not allow the user to modify the document. If the embedded font file contains an editable type of font, then the remote computer allows the user to modify the document, save the modified document to an original file name, and print the modified document on the printer. However, the editable type of font does not allow the user to save the document under a file name different from the original file name.

29 Claims, 12 Drawing Sheets

This is an example of a courier font.

FIG. 1

This is an example of a times roman font.

FIG. 2

Available Font List — 305

| Font Type |
|---|
| Courier |
| Helvetica™ |
| Times Roman |
| Century Gothic |
| Palatino™ |

FIG. 4

Available Font List — 312

| Font Type |
|---|
| Times Roman |
| Palatino™ |
| Script |

FIG. 5

METHOD AND SYSTEM FOR PROCESSING DOCUMENTS WITH EMBEDDED FONTS

CROSS-REFERENCE TO RELATED APPLICATION

This application is a continuation of U.S. patent application Ser. No. 08/045,825, filed Apr. 9, 1993, now abandoned.

DESCRIPTION

1. Technical Field

The present invention relates generally to a computer method and system for making a document portable from one computer to another, and more particularly, to a computer method and system for making the document portable from one computer to another by embedding a font in the document.

2. Background of the Invention

For sometime now computing systems have supported the output of text using different fonts. A font is a complete collection of characters of a particular style and a particular size. Therefore, the output of text using a particular font produces text in a corresponding particular style. Common styles include Courier, Helvetica™, Times Roman™, Gothic, and Palatino™. FIG. 1 illustrates the output of text in the Courier font. FIG. 2 illustrates the output of text in the Times Roman font.

FIG. 3 is a block diagram of an existing computer system 300 which allows a user of a remote computer 301 to display a document 304 previously created on a host computer 302. In order to create the document 304, the user of the host computer 302 invokes a word processing program 303. Next, the word processing program 303, upon user request, retrieves an available font list 305 which lists the fonts available for use on the host computer 302.

FIG. 4 is a block diagram of the available font list 305 of FIG. 3. As FIG. 4 illustrates, the example available font list 305 contains entries for the fonts: Courier, Helvetica, Times Roman, Century Gothic, and Palatino. These fonts are available for use on the host computer 302 (FIG. 3).

Returning to the discussion of FIG. 3, the user may select the Courier font entry from the available font list 305. In response, the word processing program 303 retrieves a Courier font file 306 corresponding to the selected Courier font entry from the available font list 305 from either a permanent storage device 307 or the host computer memory 315. One font file is stored on the permanent storage device for each font entry in the available font list 305.

The user then initiates creation of the document 304 using the retrieved Courier font file 306. In the process of creating the document 304, the word processing program 303 appends a font tag or identifier 308 to the document 304. The font identifier 308 uniquely identifies the Courier font as the font used to create the document 304. In addition to the Courier font, the document 304 may include graphics, two column text, or headers and footers, as desired. The user then formats the document 304. Typically, users can spend hours formatting documents.

Once the document 304 has been created, the user of the system 300 typically sends a request to the word processing program 303 to transfer the document 304 to the remote computer 301. This can be accomplished by a modem transfer or by use of a portable floppy disk or the like.

Once the remote computer 301 receives the document 304, it stores the document 304 in a permanent storage device 309. The user of the remote computer 301 then launches a word processing program 310. The word processing program 310, upon user request, retrieves the document 304 from the permanent storage device 309 and loads the document 304 in a remote computer memory 311 of the remote computer 301.

The word processing program 310 then retrieves the font identifier 308 of the document 304 and determines that the document 304 was created using a Courier font. Next, the word processing program 310 determines if the Courier font is listed as one of the available fonts in an available font list 312 shown in FIG. 5 of the word processing program 310. The available font list 312 lists the fonts available for use on the remote computer 301.

As FIG. 5 illustrates, the available font list 312 indicates that a Times Roman font, a Palatino font, and a Script font are the only fonts available for use on the remote computer 301. Therefore, the word processing program 310 determines that the Courier font is unavailable for use on the remote computer 301. If the Courier font identifier 308 had been listed as one of the available fonts in the available font list 312, then the word processing program 310 would have retrieved a corresponding Courier font file from the permanent storage device 309 and loaded the Courier font file into the remote computer memory 311 of the remote computer 301. The word processing program 310 would then have processed the document 304 using the retrieved Courier font file.

Since the Courier font identifier 308 was not listed as one of the available fonts in the available font list 312, the word processing program 310 retrieves a default font file 314 (i.e., a predesignated font file selected from one of the entries in the available font list 312) from the permanent storage device 309 and loads the default font file 314 into the remote computer memory 311 of the remote computer 301. The word processing program 310 then processes the document 304 using the default font file 314.

When the user of the remote computer 301 prints or otherwise visually displays the document 304 using the default font file 314, the user may find that the lines of the document 304 wrap at different characters, the soft page breaks are altered, and the headers and footers are in different positions than in the original document 304 when displayed on the host computer 302. Because the format used to reproduce the document 304 using the default font file 314 is different than the format used to reproduce the document 304 using the original font file 306, the document 304 reproduced using the default font file 314 can be difficult to read. Without access to the selected font file 306 (i.e., the Courier font) used to create the document 304, the user of the remote computer 301 has to spend extra time manually adjusting the document 304 so that it displays correctly. The need to spend extra time adjusting the format of a document is undesirable.

SUMMARY OF THE INVENTION

It is an object of the present invention to provide a method and system for processing documents on a remote computer using an embedded font that was used to create the document on a host computer.

A user of a host computer creates a document and embeds in the document itself a font file used to create the document. The user then transfers the document along with the embedded font file to a remote computer. The remote computer processes the document using the embedded font file. If the embedded font file contains a preview and print font, then the remote computer allows users to preview the document on a display screen and to print the document on a printer using the embedded font. However, the preview and print type of font does not allow the user to modify the document. If the embedded font file contains an editable type of font, then the remote computer allows the user to modify the document, save the modified document to an original file name, and print the modified document on the printer. However, the editable type of font does not allow the user to save the document under a file name different from the original file name.

BRIEF DESCRIPTION OF THE DRAWINGS

FIG. 1 is a diagram of text printed in a Courier font.

FIG. 2 is a diagram of text printed in a TimesRoman font.

FIG. 4 is a block diagram of the available font list of the host computer of FIG. 3.

FIG. 5 is a block diagram of the available font list of the remote computer of FIG. 3.

DETAILED DESCRIPTION OF THE INVENTION

Figure 3:
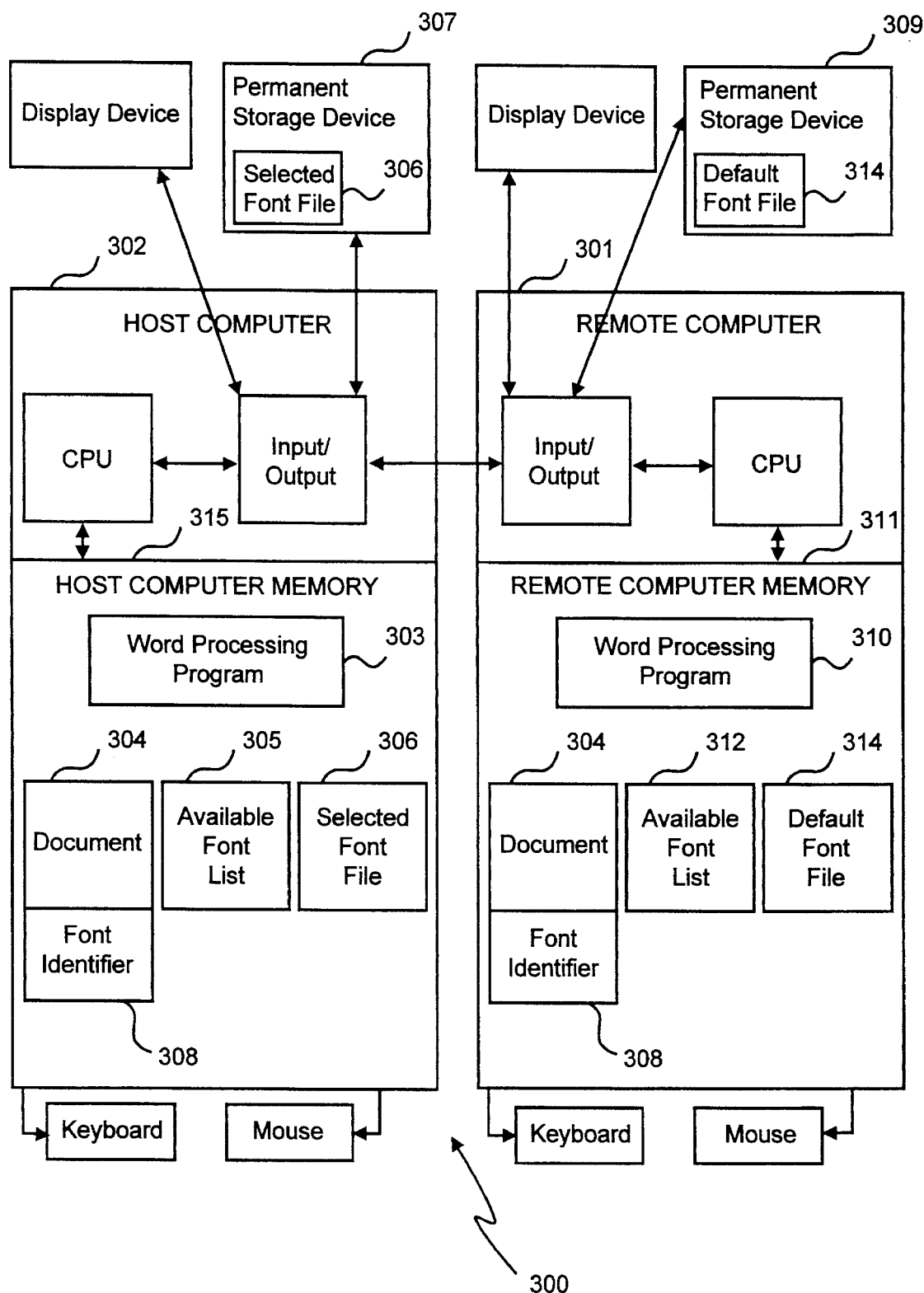
FIG. 3 is a block diagram showing a prior art system for processing documents with fonts.
Figure 6:
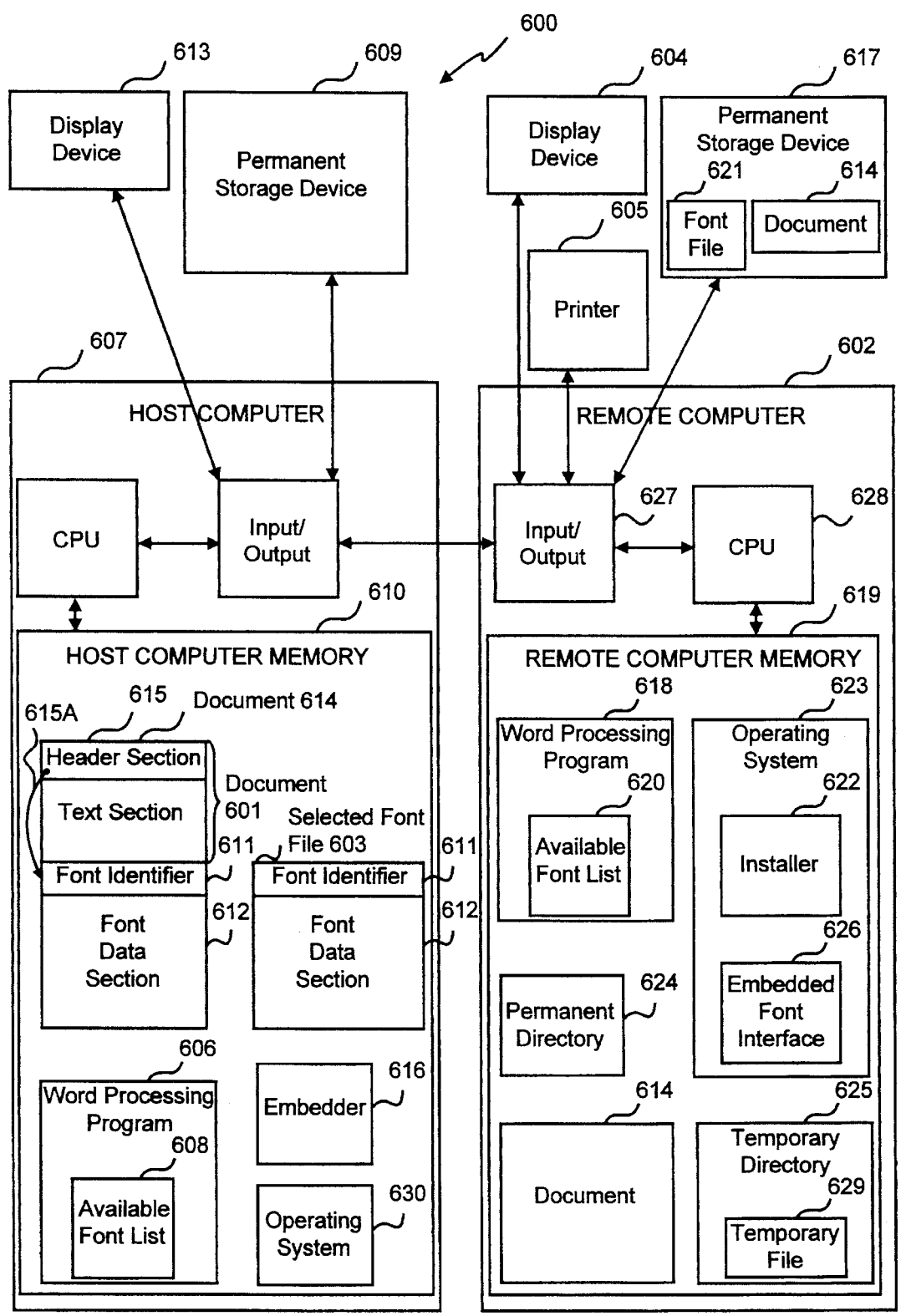
FIG. 6 is a block diagram of a system embodying the present invention for transporting and processing documents with embedded fonts.

The present invention overcomes the problems noted above with prior systems which processed documents on a remote computer using a default font. As shown in FIG. 6, the computer system 600 of the present invention embeds in the document 601 a selected font file 603 which was used to create the document so that when the document is transferred to a remote computer 602, the remote computer can display and print the document exactly as created—even when the remote computer did not previously have access to the font used to create the document.

In a preferred embodiment of the present invention four font types are provided: none, preview and print, editable, and installable. The "none" type of font does not allow font embedding. The "preview and print" type of font allows users to preview the document 601 on a display screen 604 used with the remote computer 602 and to print the document on a printer 605 using the same type of font used to create the document. However, the preview and print type of font does not allow the user to modify the document 601. The "editable" type of font allows the user to modify the document 601, save the modified document to an original file name, and print the modified document on the printer 605. However, the editable type of font does not allow the user to save the document 601 under a file name different from the original file name. The "installable" type of font provides all the flexibility of editable fonts and more. When the user of the system 600 opens a document with an installable font embedded within, the remote computer 602 determines if the embedded font is already installed on the remote computer 602. If the remote computer 602 finds that the embedded font is not already installed, then it permanently installs the embedded font on the remote computer 602. The newly installed font can be used with the document 601 as well as any other document accessible to the remote computer 602. For example, the newly installed font may be further embedded and transported with yet another document.

An example using FIG. 6 will illustrate the preferred method and system of the present invention.

Creating a Document

Initially, a user of the system 600 launches a word processing program 606 of a host computer 607. While the discussion herein refers to a word processing program 606, one of ordinary skill in the art will understand that any application program can be used (e.g., a presentation program, a desktop publishing program, or a spreadsheet program). Upon user request the word processing program 606 retrieves an available font list 608. The available font list 608 lists the fonts available for use on the host computer 607. The user then selects a font entry from the available font list 608. In response to the selection by the user, the word processing program 606 sends a request to an operating system 630 of the host computer 607 to retrieve the selected font file 603 from a permanent storage device 609 corresponding to the font entry selected from the available font list 608. The operating system 630 then loads the selected font file 603 in a host computer memory 610. The selected font file 603 includes a font identifier 611 which identifies the type of font and a font data section 612 which includes the font data.

Embedding a Font File

The word processing program 606, upon user request, creates the document 601 using the selected font file 603. Typically, the user then inputs a request to save the document 601 to the permanent storage device 609. In response to the save request the word processing program 606 queries the user on a display device 613 whether the word processing program 606 should embed the selected font file 603 in the document 601. If the user chooses not to embed the selected font file 603 in the document 601 then the word processing program 606 saves the document 601 on the permanent storage device 609.

If the user chooses to embed the selected font file 603 in the document 601 then the word processing program 606 invokes an embedder 616 stored in the host computer memory 610. In alternative embodiments the embedder 616 can be part of the operating system 630 or the word processing program 606. If the selected font file 603 is of a font type other than the preview and print font type, then the embedder 616 embeds the selected font file 603 in the document 601 to create a document 614 with an embedded font. The embedder 616 embeds the selected font file 603 at a first memory location after an ending memory location of the document 601. The first memory location after the ending memory location is indicated by an indicator 615A of a header section 615 of the document 614. Any well-known technique in the art for embedding one file in another file can be used to embed the selected font file 603 in the document 601 to create the document 614.

In the preferred embodiment, if the selected font file 603 is a preview and print type of font then the embedder 616 only embeds those characters from the selected font file 603 which were actually used to create the document 601. The preferred method for embedding the selected font file 603 in the document 601 is set forth in FIG. 8 and discussed in more detail below.

Transferring The Document With The Embedded Font File

Once the user creates the document 614 with the selected font file 603 embedded, the user typically transfers the document 614 to a remote computer 602. The remote computer 602 receives the transferred document 614 and stores the transferred document in a permanent storage device 617. The user, which may be a person different from the user that created the document 614, then launches a word processing program 618. The word processing program 618, upon user request, retrieves the document 614 from the permanent storage device 617, loads the document into a remote computer memory 619, and opens the document 614.

Next, the word processing program 618 determines if a font file is embedded in the document 614. If a font file is embedded in the document 614 then the word processing 618 determines if a font file of the type embedded in the document 614 is already accessible to the remote computer 602. The word processing program 618 makes this determination by retrieving the font identifier 611 from the document 614 stored in the remote computer memory 619 and comparing the font identifier against a list of available fonts in an available font list 620 of the word processing program 618. If the word processing program 618 determines that the selected font file 603 embedded in the document 614 has a corresponding font listed on the available font list 620, then the word processing program 618 processes the document 614 using a font file 621 stored on the permanent storage device 617 corresponding to the embedded font file 603 of the document 614. The selected font file 603 embedded in the document 614 need not be further used.

If the word processing program 618 determines that the selected font file 603 of the document 614 is not one of the fonts listed on the available font list 620, then the word processing program 618 uses the selected font file 603 embedded in the document 614 to process the document 614.

In order to use the selected font file 603 to process the document 614, the selected font file 603 must first be installed on the remote computer memory 619 so as to facilitate an implementation which ensures that the scope of the functions performed by the word processing program 618 are within the scope of the functions permitted by the type of the embedded font.

Installing The Embedded Font File

In order to help ensure that only permissible functions are performed, the word processing program 618 invokes an installer program 622 of an operating system 623 of the remote computer 602. While the discussion herein refers to a word processing program 618, one of ordinary skill in the art will understand that any application program can be used (e.g., a presentation program, a desktop publishing program, or a spreadsheet program). In a preferred embodiment of the present invention, the installer program 622 performs the steps of the method InstallEmbeddedFont, described below with more detail and shown in FIG. 11.

The installer program 622 retrieves the font identifier 611 of the selected font file 603 as embedded in the document 614 stored on the remote computer memory 619 and analyzes the font identifier 611 to determine if the font data section 612 contains an installable type of font. If the installer program 622 determines that the font file 603 contains an installable type of font, then the installer program 622 stores the selected font file 603 in a permanent directory 624 of the remote computer memory 619. The installer program 622 then adds the font identifier 611 of the selected font file 603 to the available font list 620 of the word processing program 618.

If the installer program 622 determines that the selected font file 603 contains a preview and print type of font or an editable type of font, then the installer program 622 sets a "hidden" bit equal to the value 1. The hidden bit indicates that the embedded font should not be listed on the available font list 620. In the preferred embodiment, if the hidden bit is set to 1 then only the application program that participates in the installation of the embedded font can later process the document 614 with the embedded font. After setting the hidden bit equal to the value 1, the installer program 622 copies the selected font file 603 to a temporary font file 629 and assigns a temporary name to the temporary font file 629. In the preferred embodiment, the temporary name is a name which does not suggest that the associated temporary file contains a font file.

The installer program 622 then copies the temporary font file 629 to a temporary directory 625 in the remote computer memory 619. The temporary directory 625 is not in the directory which stores the word processing program 618. By storing the selected font file 603 in the temporary font file 629 on the temporary directory 625, a user of the system 600 who navigates the remote computer memory 619 looking for the selected font file 603 will have difficulty locating the selected font file 603. By "hiding" the selected font file 603, the present invention helps prevent the user from using the selected font file 603 in ways outside the scope of its font type.

Processing The Document Using The Installed Font File

Once the installer program 622 has installed the selected font file 603 in the appropriate directory, either the permanent directory 624 or the temporary directory 625 of the remote computer memory 619, the word processing program 618 is then able to process the document 614 using the installed font. However, the processing capabilities of the word processing program 618 are limited by the type of font embedded in the document 614. In order to ensure that the scope of functions performed by the word processing program 618 are within the scope of functions permitted by the embedded font type identified by the font identifier 611 of the document 614, the word processing program 618 invokes an embedded font interface 626 of the operating system 623. In a preferred embodiment of the present invention, the embedded font interface 626 performs the steps of the method ImplementFontType, described below with more detail and shown in FIG. 12.

If the font identifier 611 indicates that the embedded font is a preview and print type of font, then the word processing program 618 performs normal processing until the user inputs a request to edit the document 614 or to close the document. In response to the request to edit the document 614, the word processing program 618 invokes the embedded font interface 626 of the operating system 623. The embedded font interface 626 preferably warns the user that the request to edit the document will lead to the deletion from the system of the font used to process the document. If the user invokes the edit request after the warning then the embedded font interface 626 deletes the temporary font file 629 from the temporary directory 625 in the remote computer memory 619. In response to the request to close the document the embedded font interface 626 deletes the temporary font file 629 from the temporary directory 625 and the temporary copy of the document 614 from the remote computer memory 619.

If the font identifier 611 indicates that the embedded font is an editable type of font, then the word processing program 618 performs normal processing until the user inputs a request to store the document 614 to a new file name. In response to store the document to the new file name, the word processing program 618 invokes the embedded font interface 626. In the preferred embodiment the embedded font interface 626 warns the user that the request to store the document to the new file name will lead to the deletion from the system of the font used to process the document. If the user invokes the store document to the new file name request after the warning then the embedded font interface 626 deletes the temporary font file 629 from the temporary directory 625 in the remote computer memory 619. In this way the embedded font is deleted from the remote computer 602, thus preventing the user from making use of the embedded font at a later time. In response to the request to close the document the embedded font interface 627 deletes the temporary font file 629 from the temporary directory 625 and the temporary copy of the document 614 from the remote computer memory 619.

If the font identifier 611 indicates that the embedded font is an installable type of font, then the word processing program 618 never invokes the embedded font interface 626 because the installable font type permits the word processing program 618 to perform its full range of processing functions on the document 614.

If no font was ever embedded in the document 614 then the word processing program 618 never invokes the embedded font interface 626. Instead, the word processing program 618 processes the document 614 using the prior art method described above with respect to FIGS. 1–5. In other words, the word processing program 618 retrieves a font identifier from the document 614 and determines if the remote computer 602 on which the document is to be processed contains a font file on the permanent storage device 617 which corresponds to the retrieved font identifier. If the permanent storage device 617 stores a corresponding font file, then the word processing program 618 processes the document 614 using the corresponding font file. If the permanent storage device 617 does not store the corresponding font file, then the word processing program 618 processes the document using a previously designated default font file.

Figure 7:
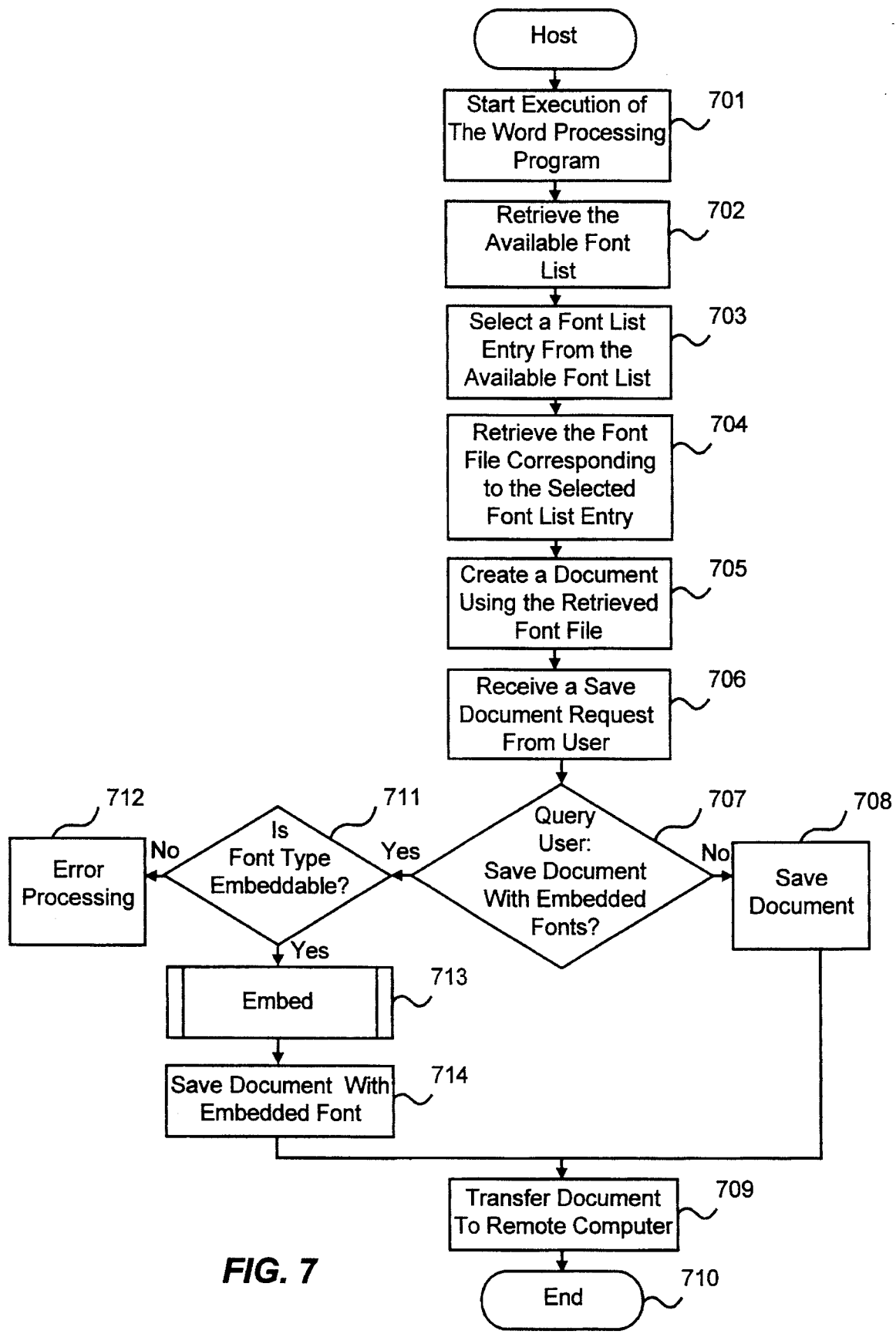
FIG. 7 is a flow diagram of the function Host for the system of FIG. 6.

Flow Diagrams:

FIG. 7 is a flow diagram of the method Host, preferably performed by the host computer 607, illustrating the preferred method of the present invention for embedding a selected font file 603 in the document 601 to form the transferred document 614 and transferring the document 614 with the selected font file 603 embedded therein, to the remote computer 602.

In step 701 of FIG. 7 the user of the system 600 invokes the word processing program 606. In step 702 the word processing program 606, upon user request, retrieves the available font list 608 of the word processing program 606. In step 703 the user selects a font list entry from the available font list 608. In step 704 the word processing program 606, upon user request, retrieves the selected font file 603 corresponding to the selected font list entry of the available font list 608. In step 705 the user creates the document 601 using the selected font file 603. In step 706 the word processing program 606 receives a save document request initiated by the user.

In response to the save document request the word processing program 606, in step 711, queries the user on the display device 613 asking the user if the selected font file 603 should be embedded in the document 601. If the user responds to the query by requesting that the document 601 be saved without the selected font file 603, then in step 708 the document 601 is saved on the permanent storage device 609 and in step 709 the document 601 can be transferred to the remote computer 602. In this way the document can be processed on the remote computer 602 using the prior art method described above with respect to FIGS. 1–5.

If the user responds to the query by requesting that the selected font file 603 be stored along with the document 601, then in step 711 the word processing program 606 determines if the selected font file 603 is an embeddable font type. In other words, the word processing program 606 determines if the font type of the selected font file 603 is one of the installable, editable, or preview and print types of fonts. If the font type is not embeddable (i.e., if the font type is "none"), then the word processing program 606 performs error processing in step 712. If the font type of the selected font file 603 is embeddable (i.e., if the font type is preview and print, editable, or installable) then in step 713 the word processing program 606 invokes the embedder 616.

The embedder 616 embeds the selected font file 603 in the document 601 using the method Embed, discussed below with respect to FIG. 8. In step 714 the word processing program 606 saves the document 614, consisting of the document 601 and the selected font file 603, on the permanent storage device 609. In step 709, in response to user request, the host computer 607 transfers the document 614 to the remote computer 602. In step 710 the method Host ends processing. In a preferred embodiment control passes to the method Remote, discussed below with respect to FIG. 9, upon completion of the method Host.

Figure 8:
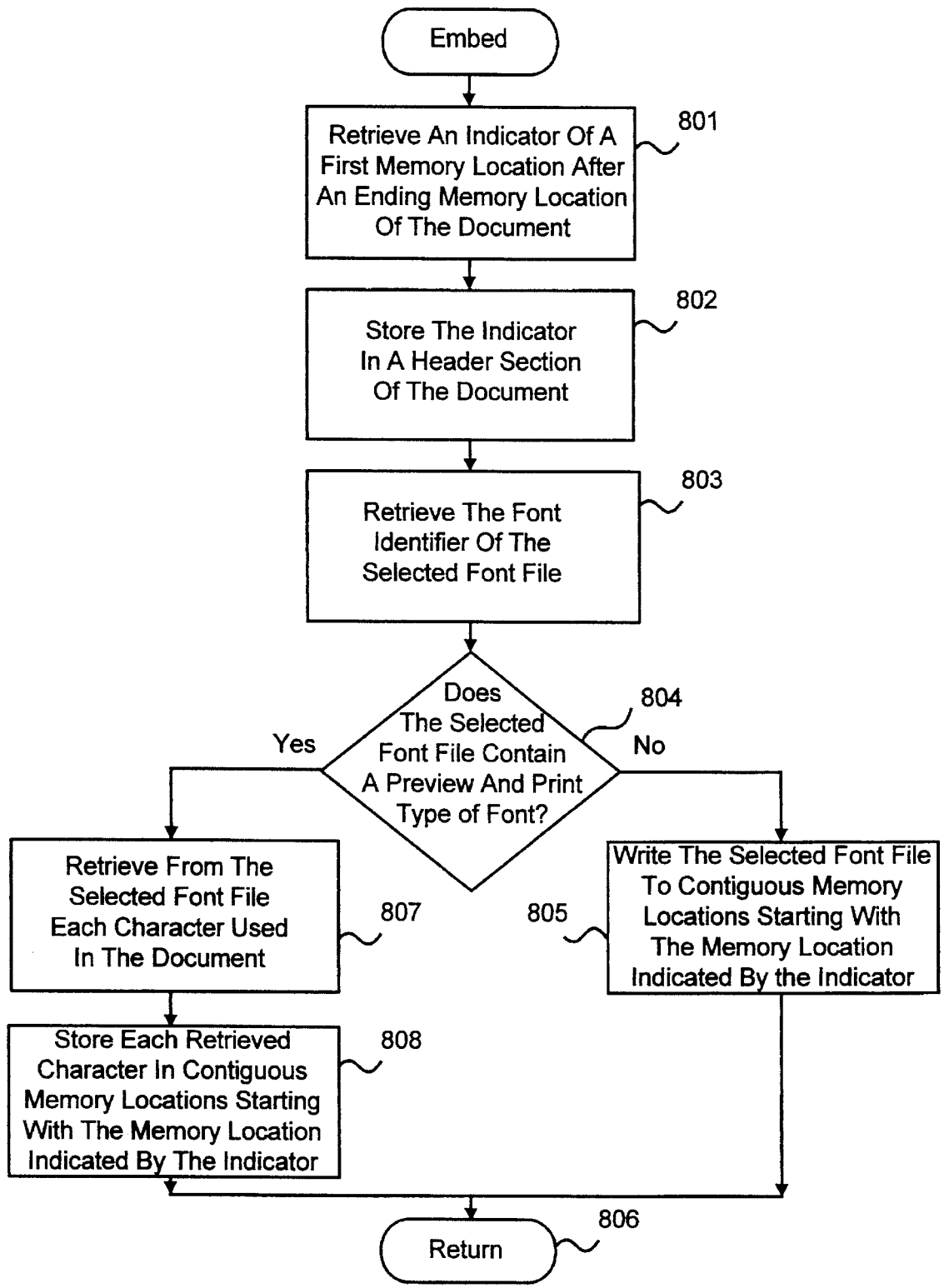
FIG. 8 is a flow diagram of the function Embed for the system of FIG. 6.

FIG. 8 is a flow diagram of the method Embed which embeds the selected font file 603 in the document 601 to create the document 614. In the preferred embodiment the method Embed is performed by the embedder 616 (FIG. 6). In step 801 the embedder 616 retrieves an indicator 615A which indicates a first memory location after an ending memory location of the document 601. In step 802 the embedder 616 stores the indicator 615A in a header section 615 of the document 601. In step 803 the embedder 616 retrieves the font identifier 611 from the selected font file 603. In step 804 the embedder 616 determines if the selected font file 603 is a preview and print type of font. If the selected font file 603 is not a preview and print type of font then steps 805-806 are performed. In step 805 the embedder 616 writes the selected font file 603 to continuous memory locations of the host computer memory 610 starting with the memory location indicated by the indicator 615A. In step 806 the method Embed returns processing control to the method Host of FIG. 7.

Returning to the discussion of step 804, if the selected font file 603 does contain a preview and print type of font then steps 807, 808 and 806 are performed. In step 807 the embedder 616 retrieves from the selected font file 603 each character used in the document 601 along with metrics, hints, global tables and other data needed to properly utilize the font on the remote computer 602. In step 808 the embedder 616 stores each retrieved character in contiguous memory locations of the host computer memory 610 starting with the memory location indicated by the indicator 615A. In step 806 the method Embed returns processing control to the method Host of FIG. 7.

Figure 9:
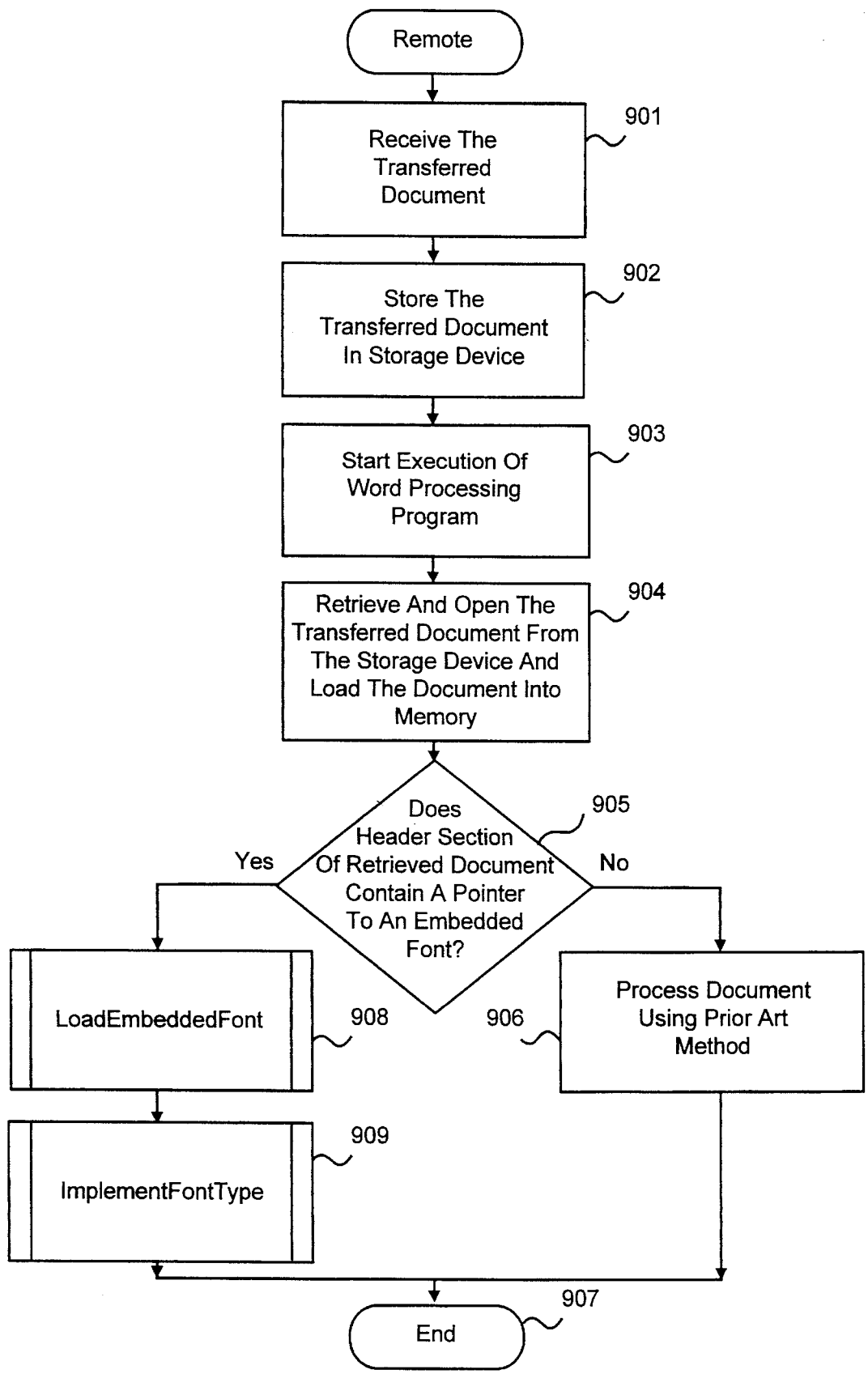
FIG. 9 is a flow diagram of the function Remote for the system of FIG. 6.

FIG. 9 is a flow diagram of the method Remote, preferably performed by the remote computer 602, to retrieve the document 614 and process the portion thereof comprising the document 601 using the embedded font file 603. In step 901 the remote computer 602 receives the document 614 from the host computer 607 using an input/output device 627. In an alternative embodiment, separate input and output devices can be utilized. In step 902 the remote computer 902 stores the document 614 in the permanent storage device 617 using a CPU 628 and the input/output device 627 of the remote computer. In step 903 the remote computer 602, upon user request, invokes the word processing program 618 stored in the remote computer memory 619. In step 904, the word processing program 618, retrieves the document 614 from the permanent storage device 617, loads the document 614 in the remote computer memory 619, and opens the document 614. In step 905 the word processing program 618 determines if the header section 615 of the document 614 contains the indicator 615A which indicates the beginning address of the embedded selected font file 603. If the font identifier 611 pointed to by the indicator 615A indicates that no font is embedded in the document 614 then in step 906 the remote computer 602 processes the document 601 using the prior art method described above with respect to FIGS. 1–5. In step 907 the method Remote ends processing of the document 614 but may continue processing other data unrelated to the document 614.

Figure 10:
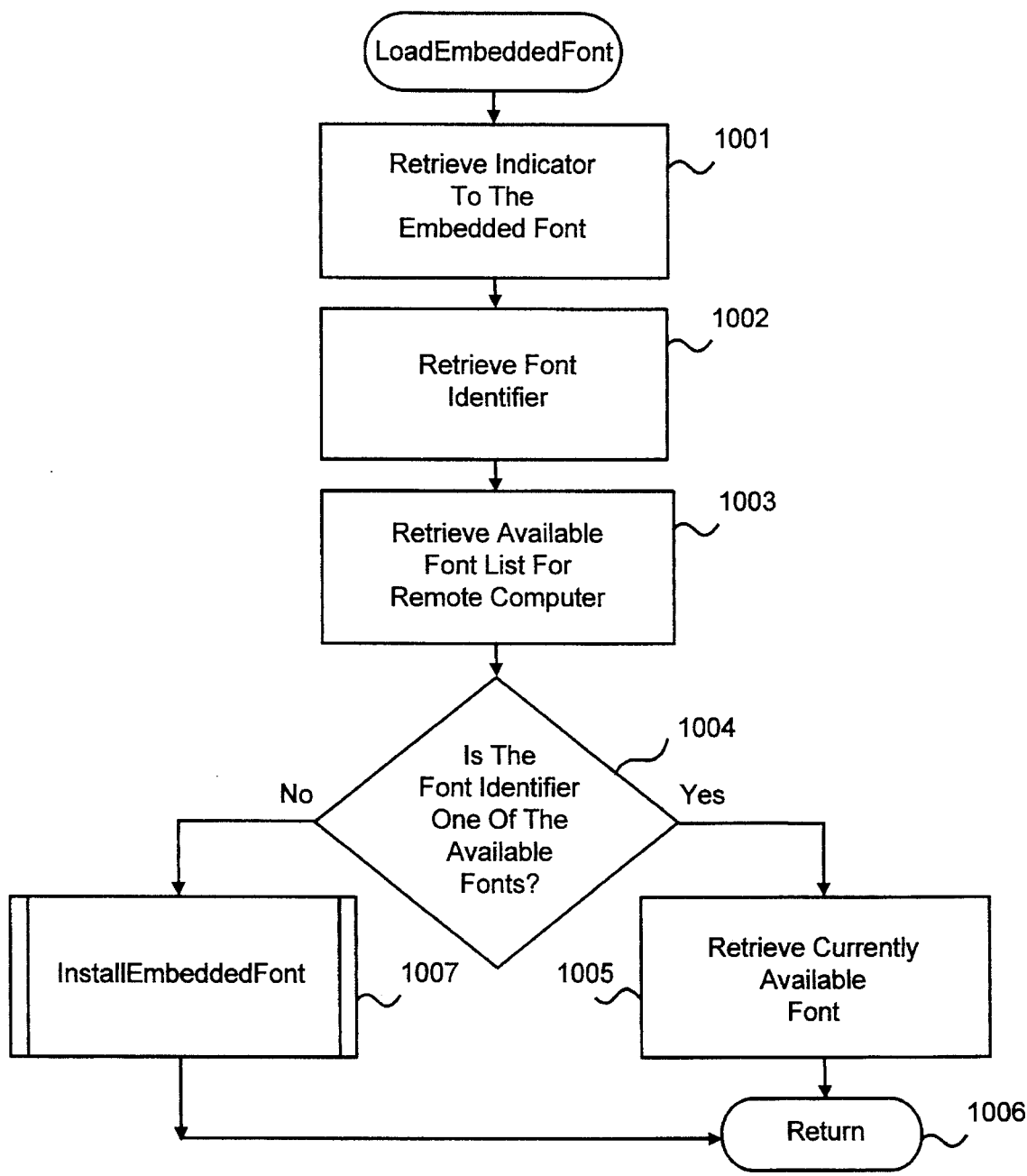
FIG. 10 is a flow diagram of the function LoadEmbeddedFont for the system of FIG. 6.

If the font identifier 611 indicates that a font file was embedded in document 614 then the method Remote invokes the method LoadEmbeddedFont of FIG. 10 in step 908. The method LoadEmbeddedFont loads the selected font file 603 in either the permanent directory 624 or the temporary directory 625 of the remote computer memory 619, depending on the font type of the selected font file 603. The method LoadEmbeddedFont is discussed in more detail below and shown in FIG. 10.

Figure 12:
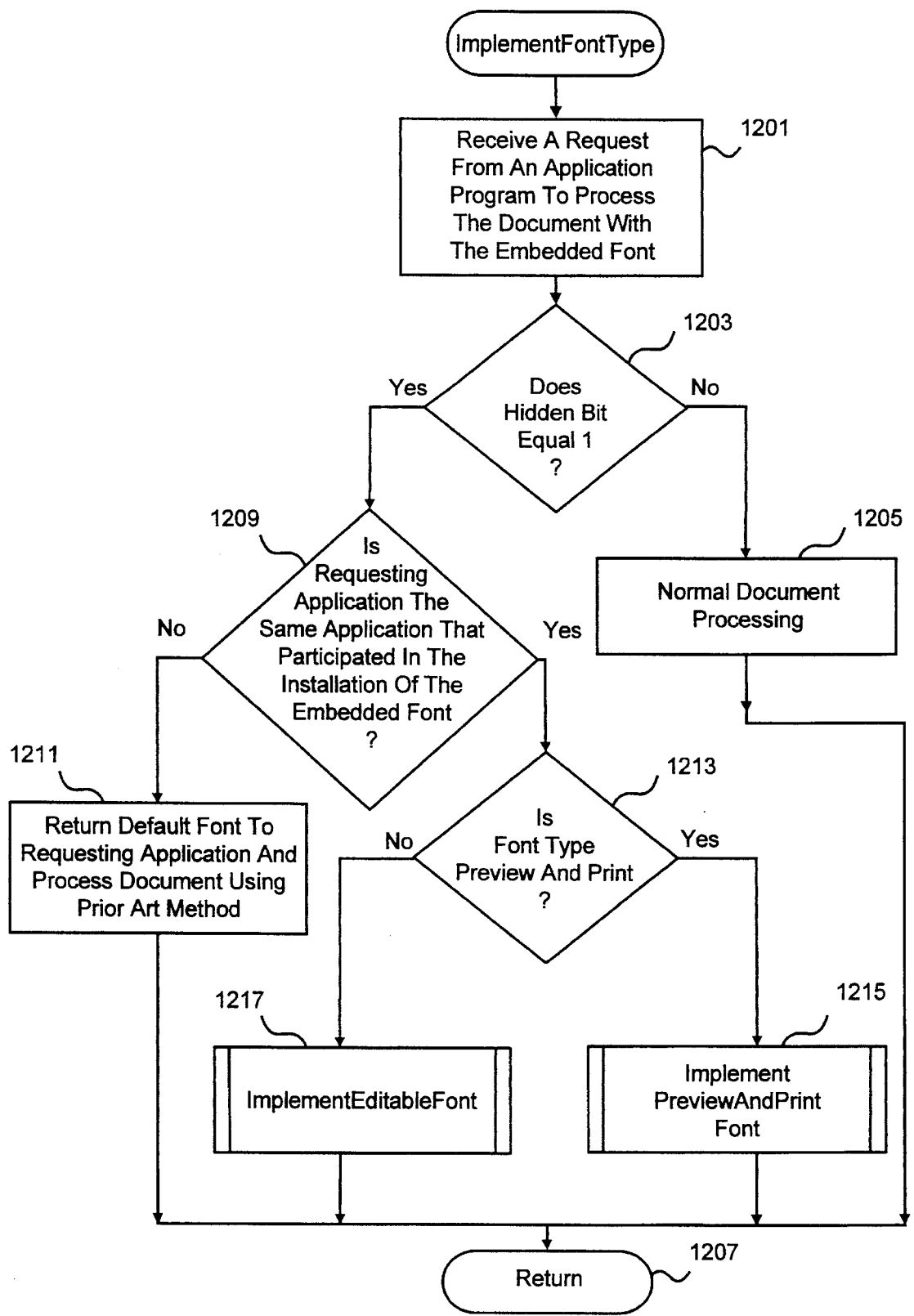
FIG. 12 is a flow diagram of the function ImplementFontType for the system of FIG. 6.

Upon completion of the method LoadEmbeddedFont the method Remote invokes the method ImplementFontType of FIG. 12 in step 909. The method ImplementFontType is discussed in more detail below and shown in FIG. 12. The method ImplementFontType ensures that the scope of functions performed by the word processing program 618 are within the scope of functions permitted by the type of font embedded in the document 614. In step 907 the function Remote ends processing of the document 614 but may continue processing other data unrelated to the document 614.

FIG. 10 is a flow diagram of the method LoadEmbeddedFont which determines whether the remote computer 602 already has access to a font file 621 which is identical to the selected font file 603 embedded in the document 614. In the preferred embodiment, the method LoadEmbeddedFont is performed by the word processing program 618 (FIG. 6). In step 1001 the word processing program 618 retrieves the indicator 615A which indicates the beginning address of the embedded selected font file 603. In step 1002 the word processing program 618 retrieves the font identifier 611 of the document 614 pointed to by the indicator 615A. In step 1003 the word processing program 618 retrieves the available font list 620. In step 1004 the word processing program 618 determines if the font identifier 611 is listed as one of the available fonts on the available font list 620. If the available font list 620 indicates that the font identified by the font identifier 611 is available to the remote computer 602 then in step 1005 the word processing program 618 retrieves the font corresponding to the font identifier 611 from the permanent storage device 617 and processes the document 614 using the retrieved font, and in step 1006, the method LoadEmbeddedFont returns processing control to the method Remote (FIG. 9).

Figure 11:
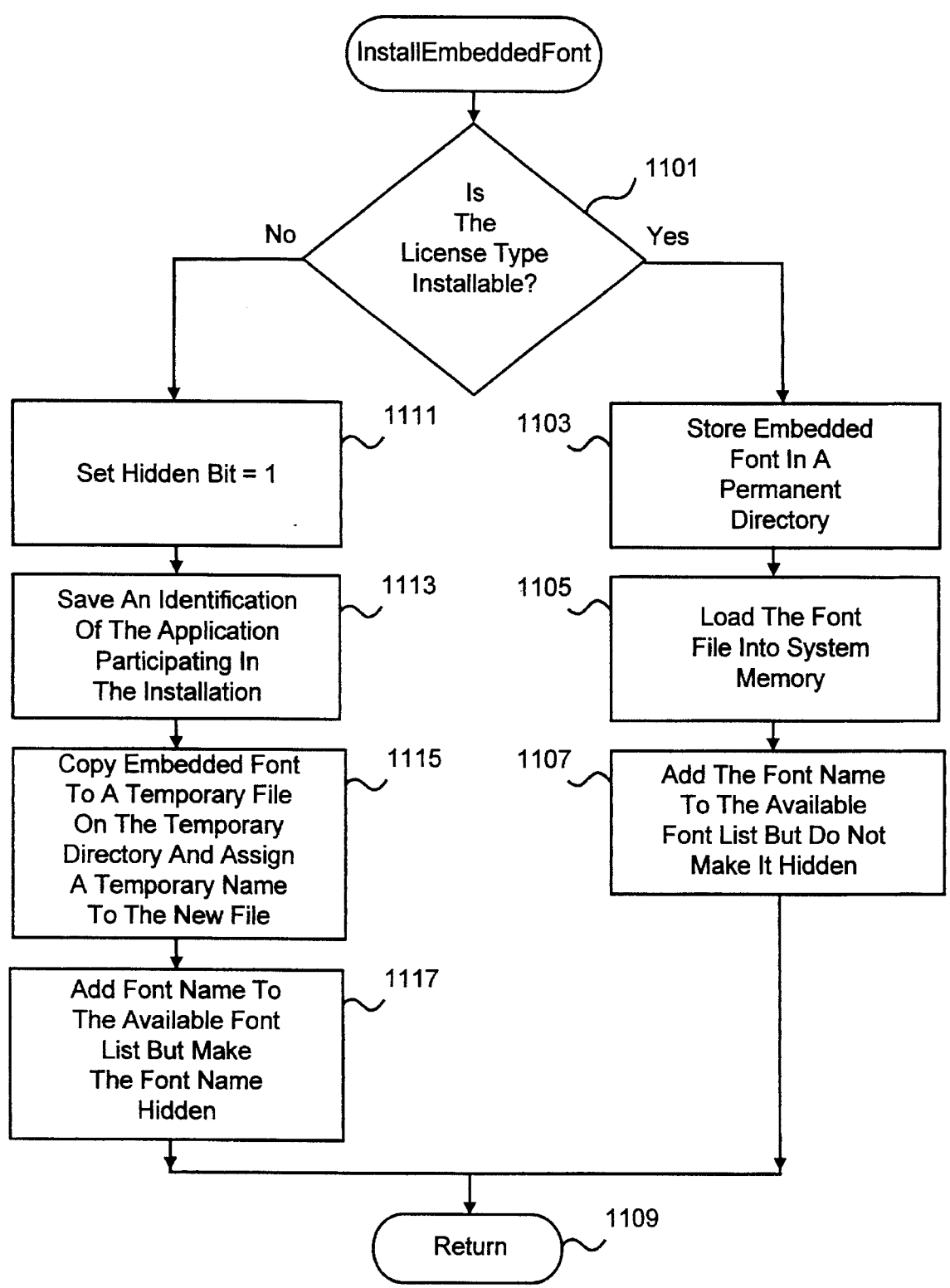
FIG. 11 is a flow diagram of the function InstallEmbeddedFont for the system of FIG. 6.

Returning to the discussion of step 1004, if the word processing program 618 determines that the font identified by the font identifier 611 is not one of the fonts currently available to the remote computer 602, then the method LoadEmbeddedFont invokes the method InstallEmbeddedFont of FIG. 11 in step 1007.

The method InstallEmbeddedFont of FIG. 11 installs the selected font file 603 on either the permanent directory 624 or the temporary directory 625. The method InstallEmbeddedFont is discussed in more detail below and shown in FIG. 11. Upon completion of the method InstallEmbeddedFont, the method LoadEmbeddedFont returns processing control to the method Remote (FIG. 9) in step 1006.

FIG. 11 is a flow diagram of the method InstallEmbeddedFont. In the preferred embodiment of the present invention the method InstallEmbeddedFont is performed by installer 622 of the operating system 623 in conjunction with the word processing program 618. In step 1101 the installer 622 determines if the font identifier 611 identifies the selected font file 603 as an installable type of font. If the selected font file 603 is an installable type of font then steps 1103–1109 are performed. In step 1103 the installer 622 stores the embedded font in the permanent directory 624. In step 1105, the installer 622 loads the font file into system memory. In step 1107 the installer 622 adds the font name of the selected font file 603 to the available font list 620 of the word processing program 618 but does not make it hidden. In this way the font name can be displayed to the user. In step 1109 the method InstallEmbeddedFont returns processing control to the method LoadEmbeddedFont (FIG. 10).

Returning to the discussion of step 1101, if the installer 622 determines that the selected font file 603 is not an installable type of font (i.e., if the installer 622 determines that the selected font file 603 is an editable, or a preview and print type of font) then in step 1111 the installer 622 sets a hidden bit equal to the value 1. The hidden bit indicates that the embedded font should not be displayed to the user on the available font list 620. In step 1113 the installer 622 saves an identification of the application program (e.g., the word processing program 618) that is participating in the installation. In step 1115 the installer 622 copies the selected font file 603 to a temporary font file 629 on the temporary directory 625 and assigns a temporary name to the temporary font file 629. In the preferred embodiment, the temporary name is a name which does not suggest that the associated temporary file contains a font file. The temporary directory 625 is not in the directory which stores the word processing program 618. By storing the selected font file 603 in the temporary font file 629 on the temporary directory 625, a user of the system 600 who navigates the remote computer memory 619 looking for the selected font file 603 will have difficulty locating the selected font file 603. By "hiding" the selected font file 603 the present invention helps prevent the user from using the selected font file 603 in ways outside the scope of its font type. In step 1117 the installer 622 adds the font name of the selected font file 603 to the available font list 620 but makes the font name hidden so that it is not displayed to the user. Upon completion of step 1117, the method InstallEmbeddedFont, in step 1109, returns to the method LoadEmbeddedFont (FIG. 10).

FIG. 12 is a flow diagram of the method ImplementFontType. In the preferred embodiment of the present invention the method ImplementFontType is performed by the word processing program 618 and the embedded font interface 626 of the operating system 623. The method ImplementFontType ensures that the scope of functions performed by the word processing program 618 are within the scope of functions permitted by the type of font embedded in document 614.

In step 1201 the embedded font interface 626 receives a request from an application program to process the document 614 with the embedded font. In step 1203 if the embedded font interface 626 determines that the hidden bit does not equal 1 then in step 1205 the application program (not shown) which made the request to process the document 614 with the embedded font, performs normal processing tasks on the document 614. In step 1207 the method ImplementFontType returns processing control to the method Remote (FIG. 9).

Returning to the discussion of step 1203, if the embedded font interface 626 determines that the hidden bit equals 1 then in step 1209 the embedded font interface 626 determines whether the application program making the request to process the document 614 with the embedded font is the same application that participated in the installation of the embedded font. If the application program making the request to process the document 614 with the embedded font is not the same application program that participated in the installation of the embedded font then, in step 1211, the operating system 623 returns the default font to the application program making the request and the application program making the request then processes the document 614 using the prior art method described above with respect to FIGS. 1–5. Upon completion of step 1211, the method ImplementFontType, in step 1207, returns processing control to the method Remote (FIG. 9).

Figure 13:
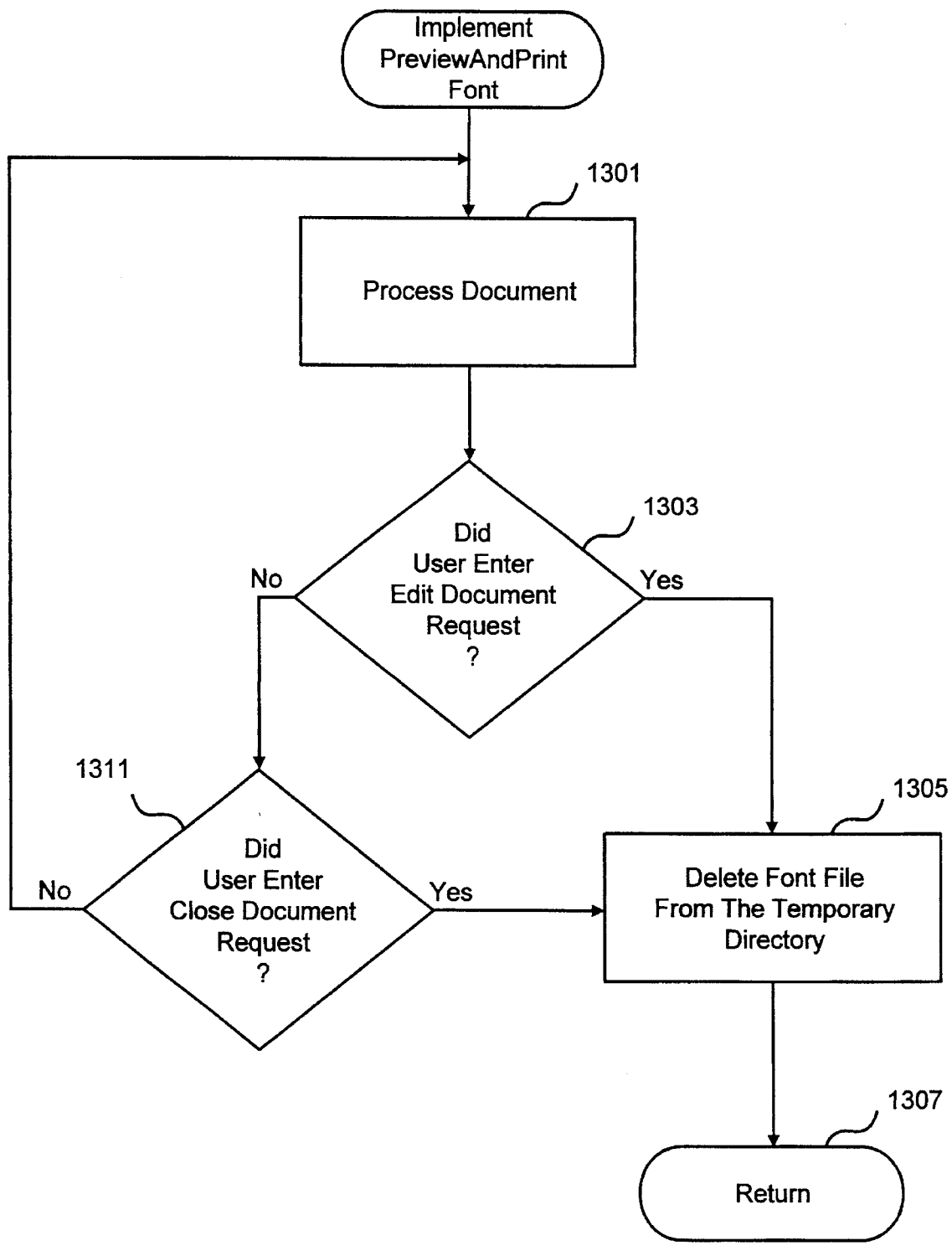
FIG. 13 is a flow diagram of the function ImplementPreviewAndPrintFont for the system of FIG. 6.

Returning to the discussion of step 1209, if the application program making the request to process the document 614 with the embedded font is the same application program that participated in the installation of the embedded font then in step 1213 the embedded font interface 626 determines if the embedded font is of the preview and print type of font. If the embedded font is a preview and print type of font then in step 1215, the method ImplementFontType calls the method ImplementPreviewAndPrintFont. The method ImplementPreviewAndPrintFont ensures that the scope of functions performed by the word processing program 618 on the document 614 are within the scope of functions permitted by the preview and print type of font. The method ImplementPreviewAndPrintFont is discussed in more detail below and is shown in FIG. 13. Upon completion of step 1215, the method ImplementFontType returns processing control, in step 1207, to the method Remote (FIG. 9).

Figure 14:
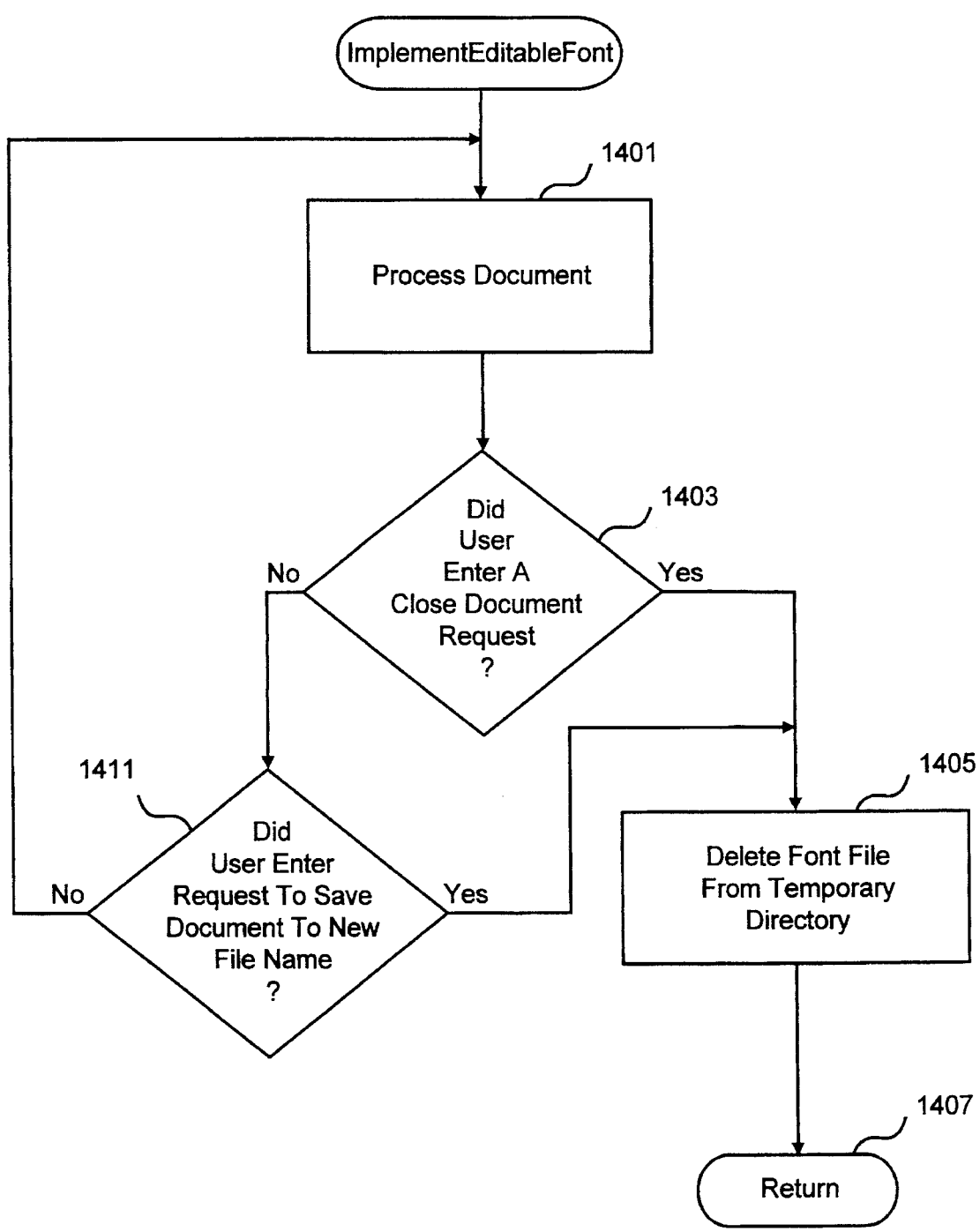
FIG. 14 is a flow diagram of the function ImplementEditableFont for the system of FIG. 6.

Returning to the discussion of step 1213, if the embedded font is not a preview and print type of font then in step 1217 the method ImplementFontType calls the method ImplementEditableFont. In the preferred embodiment, the method ImplementEditableFont is performed by the word processing program 618 in conjunction with the embedded font interface 626. The method ImplementEditableFont ensures that the scope of functions performed by the word processing program 618 on the document 614 are within the scope of functions permitted by the editable type of font. The method ImplementEditableFont is discussed in more detail below and is shown in FIG. 14. Upon completion of step 1217, the method ImplementFontType returns processing control to the method Remote (FIG. 9).

FIG. 13 is a flow diagram of the method ImplementPreviewAndPrintFont which ensures that the scope of functions performed by the word processing program 618 are within the scope of functions permitted by the preview and print type of font. In the preferred embodiment, the method ImplementPreviewAndPrintFont is performed by the word processing program 618 in conjunction with the embedded font interface 626 of the operating system 623.

In step 1301 the word processing program 618 processes the document 614. In step 1303 the word processing program 618 determines if the user entered a request to edit the document 614.

If the user did enter the request to edit the document 614, then steps 1305 through 1309 are performed. In step 1305 the embedded font interface 626 deletes the temporary font file 629 from the temporary directory 625. In step 1307 the method ImplementPreviewAndPrintFont returns processing control to the method ImplementFontType (FIG. 12).

Returning to the discussion of step 1303, if the word processing program 618 did not receive the request to edit the document 614 then in step 1311 the word processing program 618 determines if it has received a request to close the document 614. If the word processing program 618 did not receive a request to close the document 614 then processing continues with step 1301. However, if the word processing program 618 did receive a request to close the document 614 then processing continues with steps 1305 through 1307. In step 1305 the embedded font interface 626 deletes the temporary font file 629 from the temporary directory 625. In step 1307 the method ImplementPreviewAndPrint font returns processing control to the method ImplementFontType (FIG. 12).

FIG. 14 is a flow diagram of the method ImplementEditableFont which ensures that the scope of the functions performed by the word processing program 618 are within the scope of functions permitted by the editable font type. In step 1401 the word processing program 618 processes the document 614 using normal processing techniques. In step 1403 the word processing program 618 determines if the user entered the request to close the document 614.

If the user did enter the closed document request, then in step 1405, the embedded font interface 626 deletes the temporary font file 629 from the temporary directory 625. In step 1407 the method ImplementEditableFont returns processing control to the method ImplementFontType (FIG. 12).

Returning to the discussion of step 1403 if the user did enter the close document request then in step 1411, the word processing program 618 determines if the user entered a request to store the document 614 to a new file name. If the user did not enter a request to store the document 614 to a new file name then processing continues with step 1401. However, if the user did enter the request save the document 614 to the new file name then processing continues with steps 1405 through 1407. In step 1405 the embedded font interface 626 deletes the temporary font file 629 from the temporary directory 625. In step 1407 the method ImplementEditableFont returns processing control to the method ImplementFontType (FIG. 12).

Those of ordinary skill in the art will understand that other system architectures can be used to implement the methods of the present invention described above, including, but not limited to, a local area network in which several computers are coupled with file servers to share access to data among computer users through a data communications network.

It will be appreciated that, while a specific embodiment of the invention has been described herein for purposes of illustration, various modifications may be made without departing from the spirit and scope of the invention. Accordingly, the invention is not limited, except as by the appended claims.

We claim:

1. A method executed in a computer system for processing a document contained in a document file using an embedded font stored in a font file, the document file containing the font file, the document file having been created on a host computer, the computer system including a remote computer having a main memory and a permanent memory, the document file having an associated document file name, the font file having an associated font file name, the embedded font stored in the font file having one of a plurality of font types, each font type defining which of a plurality of functions available from an application program are allowed to be performed by the remote computer on the document using the embedded font, the method comprising the steps of:

receiving the document file in the remote computer;

retrieving the font file from the document file;

assigning a new font file name to the retrieved font file;

creating a temporary directory in the permanent memory which is not associated with a directory which stores the application program;

storing the retrieved font file under the new font file name in the temporary directory;

determining the font type of the embedded font contained in the document file;

in response to a determination that the embedded font type is a predetermined one of the plurality of font types, recognizing if a user of the remote computer has selected a predetermined one of the plurality of available functions; and in response to recognizing the selection of the predetermined function, deleting the stored retrieved font file from the temporary directory.

2. A computer system for processing a document contained in a document file using an embedded font stored in a font file, the font file being contained in the document file, the document file having been created on a host computer, the computer system including a remote computer having a main memory and a permanent memory, the document file having an associated document file name, the font file having an associated font file name, the embedded font stored in file font file having one of a plurality of font types, each font type defining which of a plurality of functions available from an application program are allowed to be performed by the remote computer-on the document using the embedded font, the system comprising:

means for receiving the document file in the remote computer, means for retrieving the font file from the document file;

means for assigning a new font file name to the retrieved font file;

means for creating a temporary/directory in the permanent memory which is not associated with a directory which stores the application program;

means for storing the retrieved font file under the new font file name in the temporary directory;

means for determining the font type of the embedded font contained in the document file;

means for determining if the embedded font type is a predetermined one of the plurality of font types;

means for recognizing if a user of the remote computer has selected a predetermined one of the plurality of available functions; and means for deleting the stored font file from the temporary directory in response to the recognizing means recognizing the selection of the predetermined function.

3. A method executed in a computer system for processing a document contained in a document file using an embedded font stored in a font file, the font file being contained in the document file, the document file having been created on a host computer, the computer system including a remote computer, the font file having an associated font file name, the embedded font stored in the font file being in one of a plurality of font classifications, each font classification defining which of a plurality of functions available from an application program are permitted to be performed by the remote computer on the document using tile embedded font, the method comprising the steps of:

receiving the document file in the remote computer;

retrieving the font file from the document file;

determining the font classification of the embedded font in the retrieved font file;

in response to the determination of the font classification, recognizing if a user of the remote computer has selected an impermissible function; and in response to recognizing the selection of the impermissible function, deleting the font file.

4. The method of claim 3 wherein the determined font classification is an editable font classification, and wherein the impermissible function is a function to save the document to another document file with a file name different from the associated document file name.

5. The method of claim 3 wherein the determined font classification is an editable font classification, and wherein the impermissible function is a function to close the document file.

6. The method of claim 3 wherein the determined font classification is a preview and print font classification, and wherein the impermissible function is a function to edit the document file.

7. The method of claim 3 wherein the determined font classification is a preview and print font classification, and wherein the impermissible function is a function to close the document file.

8. The method of claim 3 wherein the application program is stored in a directory in a permanent memory of the remote computer, the method further comprising the steps of creating a temporary directory in the permanent memory which is not associated with the application program directory, and storing the retrieved font file in the temporary directory.

9. The method of claim 3 wherein the determined font classification is an installable font classification, further comprising the steps of:

installing the retrieved font file at the remote computer system;

receiving a user request to generate a new document using the newly installed font file at the remote computer; and upon receiving the user request to generate the new document using the newly installed retrieved font file at the remote computer system, generating the new document using the newly installed retrieved font file.

10. A computer system for processing a document contained in a document file using an embedded font stored in a font file, the font file being contained in the document file, the document file having been created on a host computer, the computer system including a remote computer, the font file having an associated font file name, the embedded font stored in the font file having one of a plurality of font types, the computer system also including a software program that provides a plurality of functions, the system comprising:

means for receiving the document file in the remote computer;

means for retrieving the font file from the document file;

means for assigning a new font file name to the retrieved font file;

means for storing the retrieved font file under the new font name;

means for determining the font type of the embedded font;

means for determining if the embedded font type is a predetermined one of the plurality of font types;

means for recognizing if a user of the remote computer has selected a predetermined one of the plurality of functions; and means for deleting the font file in response to the recognizing means recognizing the selection of the predetermined function.

11. The system of claim 10 wherein the predetermined font type is an editable font type, and wherein the predetermined function is a function to save the document to another document file with a document file name different from the associated document file name.

12. The system of claim 10 wherein the predetermined font type is an editable font type, and wherein the predetermined function is a function to close the document file.

13. The system of claim 10 wherein the predetermined font type is a preview and print font type, and wherein the predetermined function is a function to edit the document file.

14. The system of claim 10 wherein the predetermined font type is a preview and print font type, and wherein the predetermined function is a function to close the document file.

15. The computer system of claim 10 wherein the software program of the computer system includes an available font list which lists the font files available for use on the remote computer, the system further comprising means for ensuring that the font file is not listed on the available font list.

16. The system of claim 15 wherein the ensuring means further comprises means for permitting only the software program to process the document using the embedded font stored in the font file.

17. The system of claim 10 wherein the predetermined font type is an installable font type, further comprising:

means for installing the retrieved font file at the remote computer system; and means for generating a new document using the newly installed retrieved font file.

18. A method in a computer system for processing document data contained in a document file, the method comprising the computer-implemented steps of:

receiving font data to be stored in a font file;

determining a license type of the font file, the license type indicating a plurality of functions that are performable with the font data in the font file;

storing the font data in the font file with the license type;

receiving a request from a user to process the document data with the font data in the font file;

after processing the document data, receiving another request from the user to embed the font data in the document file; and upon receiving the request from the user to embed the font data in the document file, determining the license type of the font file containing the font data;

storing the determined license type in the document file;

when the determined license type is of a first type, storing all of the font data of the font file in the document file; and when the determined license type is of a second type, storing the font data corresponding to the document data in the document file.

19. The method of claim 18 wherein the first type is an installable type.

20. The method of claim 18 wherein the first type is an editable type.

21. The method of claim 18 wherein the second type is a preview and prim type.

22. A method in a computer system for ensuring that use of font data in a font file is consistent with a license type of the font file, the computer system having a document file with document data generated with the font data in the font file, the license type indicating a plurality of functions that are performable with the font data in the font file, the method comprising the computer-implemented steps of:

receiving a request from a user to perform a function on the document data using the font data in the font file;

in response to receiving the request, determining the license type of the font file; and upon determining the license type of the font file, determining whether the determined license type indicates that the received request to perform the function identifies a permissible function;

when the received request to perform the function identifies a permissible function, performing the function; and when the received request to perform the function identifies an impermissible function, notifying the user that the function will not be performed.

23. The method of claim 22 wherein an application program generates the document data, further comprising:

receiving a request to perform a function on the document data;

upon receiving the request, determining whether the application program that generated the document data is the application program requesting to perform the function; and when the application program that generated the document data is the application program that requests to perform the function, performing the function.

24. A method in a computer system for ensuring that use of font data in a font file is consistent with a license type of the font file, the computer system having a document file generated with the font data in the font file at a host computer for transmitting to a plurality of remote computers, the document file having document data, the license type indicating a plurality of functions that are performable with the font data in the font file, the method comprising the computer-implemented steps of:

under the control of the host computer, embedding the font data and license type of the font file containing the font data in the document file; and transmitting the document file with the embedded font data and license type to each of the remote computers; and under the control of each of the remote computers, receiving the transmitted document file;

retrieving the font data from the document file; and processing the document data in the document file using the retrieved font data.

25. The method of claim 24 wherein the step of embedding the font data and license type of the font file containing the font data in the document file further comprises:

receiving a user request to embed the font data from the font file in the document file;

in response to receiving the user request to embed the font data, determining the license type of the font file containing the font data to be embedded;

after determining the license type, when the license type is of a first type, retrieving all of the font data from the font file; and when the license type is of a second type, retrieving only the font data relating to the document data from the font file; and embedding the retrieved font data in the document file.

26. The method of claim 24 wherein each of the remote computers includes a remote font file, and, wherein, after the step of receiving the transmitted document file, further comprising:

determining whether the document data in the document file can be processed with the font data in the remote font file;

when the document data in the document file can be processed with the font data in the remote font file, retrieving the font data from the remote font file; and processing the document data using the retrieved font data; and when the document data can not be processed with the font data in the remote font file, retrieving the font data from the document file;

installing the retrieved font data at the remote computer; and processing the document data using the installed font data.

27. The method of claim 24 further comprising:

under the control of each of the remote computers, determining that the document data can not be processed without using the embedded font data;

determining whether the license type is of a first type or of a second type; and after determining whether the license type is of a first type or of a second type, retrieving the font data from the document file;

when the license type is of the first type, installing the retrieved font data permanently at the remote computer; and when the license type is of the second type, installing the retrieved font data temporarily at the remote computer.

28. The method of claim 24 further comprising:

under the control of each of the remote computers, receiving a user request to perform a function on the document data; and after receiving the user request to perform the function on the document data, when the license type is of a first type, performing the function; and when the license type is of a second type, determining whether the function is a permissible function; and when it is determined that the function is a permissible function, performing the function.

29. The method of claim 24 further comprising:

under the control of each of the remote computers, retrieving the font data from the document file;

storing the retrieved font data in a remote font file;

receiving a request from an application program to process the document data in the document file;

determining whether the application program requesting to process the document data using the font data is the same application program that generated the document data using that font data;

when it is determined that the application program is the same application program, allowing processing of the document data using the font data contained in the stored font file; and when it is determined that the application program is not the same application program, allowing processing of the document data using the font data contained in a default font file.

* * * * *

UNITED STATES PATENT AND TRADEMARK OFFICE
CERTIFICATE OF CORRECTION

PATENT NO.    :   5,528,742
DATED         :   June 18, 1996
INVENTOR(S)   :   George M. Moore et al.

It is certified that error appears in the above identified patent and that said Letters Patent is hereby corrected as shown below:

In column 13, claim 2, line 12, please delete "computer-on", and insert therefor --computer on--.

In column 14, claim 2, line 3, please delete "temporary/directory", and insert therefor --temporary directory--.

In column 14, claim 3, line 11, please delete "tile", and insert therefor --the--.

In column 16, claim 21, line 2, please delete "prim", and insert therefor --print--.

Signed and Sealed this

Twenty-second Day of October, 1996

*Attest:*

BRUCE LEHMAN

*Attesting Officer*     Commissioner of Patents and Trademarks